3,490,865
TREATMENT OF FLUID STREAMS
Edward E. Huxley, Pasadena, Tex., assignor to Phillips Petroleum Company, a corporation of Delaware
Filed Nov. 17, 1964, Ser. No. 411,855
Int. Cl. B01d 47/02
U.S. Cl. 23—3      9 Claims

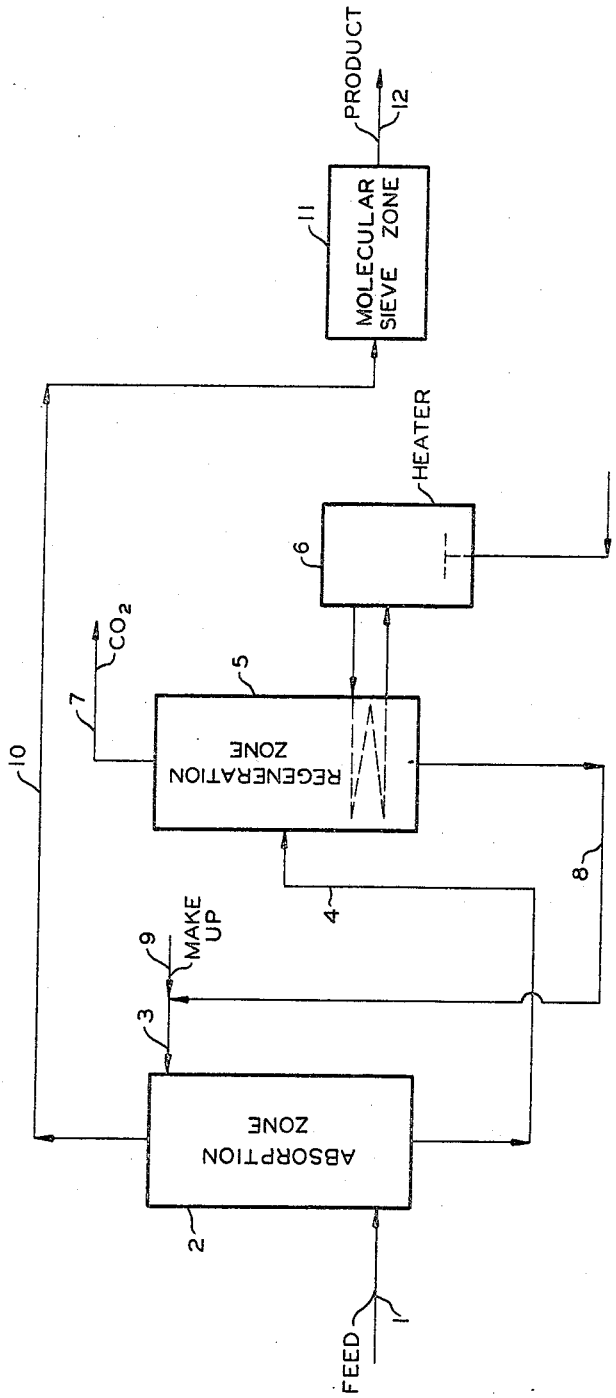

ABSTRACT OF THE DISCLOSURE

Method of removing carbon dioxide and carbonyl sulfide from a fluid hydrocarbon stream comprising removing the carbon dioxide therefrom by contact of the stream with a liquid absorbent and thereafter removing the carbonyl sulfide by contacting the stream with a molecular sieve material having average pore diameters in the range of 10 to 13 Angstrom units which has been activated prior to said contacting by heating at a temperature and for a time sufficient to remove the water of hydration from the molecular sieve.

---

This invention relates to the treatment of fluids. In one of its aspects this invention relates to the removal of undesirable constituents from hydrocarbon fluids. In another of its aspects, the invention relates to the removal of sulfur-containing compounds, e.g., carbonyl sulfide from hydrocarbon fluids. Still another aspect of this invention is the removal of undesirable constituents from a hydrocarbon fluid utilizing a molecular sieve material. In still a further aspect, this invention relates to the removal of sulfur-containing compounds from a hydrocarbon fluid, e.g., natural gas which contains carbon dioxide or other constituents which would hinder the removal of the sulfur-containing compounds.

The removal of sulfur components from fluid streams and particularly natural gas streams is extremely important to industry for several reasons. The presence of sulfur-containing compounds in such streams may result in the deposition of sulfur salts which can cause plugging and corrision of transmission pipes, valves, reglators, and the like. Also the sulfur compounds can produce undesirable side reactions with other materials contacting the stream. Due to an increased demand for natural gas, in recent years there has been an ever increasing use of "sour" gas fields. Since the "sour" gases contain many sulfur-containing compounds, it is therefore necessary to remove the sulfur-containing components prior to subsequent use.

One method for the removal of sulfur-containing compounds, e.g., carbonyl sulfide from fluids has been the use of a molecular sieve to selectively adsorb the carbonyl sulfide from the hydrocarbon fluid stream. However, it has been found that if the hydrocarbon fluid stream contains carbon dioxide, and in some cases other impurities, the carbon dioxide will be preferentially adsorbed by a molecular sieve material, thereby allowing such material as carbonyl sulfide to remain in the hydrocarbon fluid stream.

I have now developed a method whereby the removal of sulfur-containing compounds, e.g., carbonyl sulfide in a fluid stream containing carbon dioxide can be effected.

It is therefore an object of this invention to provide a method for removing impurities from a fluid stream. A further object of this invention is to provide an effective way to remove sulfur-containing materials, e.g., carbonyl sulfide, from a hydrocarbon gas stream containing carbon dioxide. Still further, an object of this invention is to provide a method whereby a hydrocarbon fluid stream may be pretreated to remove carbon dioxide therefrom prior to subsequent treating steps. Another object of this invention is to provide a method whereby both sulfur-containing compounds and carbon dioxide may be removed from a hydrocarbon fluid stream.

Other aspects, objects, and the several advantages of this invention are apparent from a study of this disclosure, the drawing and the appended claims.

In accordance with the practice of my invention a fluid stream containing both a sulfur-containing compound, for example, carbonyl sulfide, and other impurities such as carbon dioxide, is rendered capable of having the sulfur-containing compound removed by a molecular sieve by pretreating the stream to remove the carbon dioxide therefrom. The pretreated fluid stream is then passed through a molecular sieve zone wherein the sulfur-containing impurities, e.g., carbonyl sulfide, are removed. The fluid stream emerging from the molecular sieve zone will be substantially free of impurities.

The pretreatment of a fluid stream such as a hydrocarbon fluid stream to remove carbon dioxide therefrom can be accomplished by any one of a number of ways. One such way involves scrubbing of the hydrocarbon fluid stream by monoethanolamine. In this method, the hydrocarbon fluid stream is passed through the monoethanolamine solution which absorbs the carbon dioxide. This may be accomplished in an absorption zone by means of an absorber which can be a packed tower, a bubble plate column, a gas washer or any other suitable form of gas and liquid contact apparatus. The solution from the absorption equipment is passed to a stripping column where heat is applied to boil this solution and release the carbon dioxide. The lean stripped solution is then passed to heat exchangers and returned to the absorption equipment to again adsorb carbon dioxide.

Carbon dioxide and other impurities can also be removed from the hydrocarbon stream by contacting the stream with caustic or potassium carbonate in a suitable treating means. In this method, an absorption zone similar to that used in the contact of monoethanolamine with the hydrocarbon stream as hereinbefore described, can be used. When potassium carbonate is used, it can be used in either a regenerative or a non-regenerative process. By regenerative it is meant that following the absorption and contacting step the absorbing solution is retreated so that it may be recycled. This retreating step can also include the recovery of the removed carbon dioxide. In the non-regenerative process, the absorbing solution is discarded. Means and methods for the regeneration of both the caustic and the potassium carbonate absorption solutions would be readily apparent to those skilled in the art.

A large variety of weak bases such as sodium carbonate, calcium hydroxide water soluble amines, and the like, are known to be suitable for carbon dioxide absorption, and may be used. The preferred class are the water-soluble alkylolamines such as the mono-, di- and triethanolamines, propanolamines, and the like.

The molecular sieves which are suitable for use in this invention are generally synthetically produced zeolite crystals of metal aluminosilicates. When the water of hydration of these crystals is driven off, the crystal does not collapse or rearrange as is the case with most hydrated materials. Instead the physical structure of the crystal remains unchanged which results in a network of empty pores and cavities that comprise about one-half of the total volume of the crystals, thereby rendering the crystals capable of adsorbing various materials. The water of hydration can be driven off by heating the molecular sieve materials to any suitable temperature, preferably in the range of about 300° F. to 600° F.

Suitable molecular sieve materials for use in the process of this invention are Linde molecular sieve types 10X and 13X. These molecular sieve types are available from the Molecular Sieve Products, Linde Company (a division of Union Carbide Corporation), P.O. Box 44, Tonawanda, N.Y. The Linde Molecular Sieve Bulletin No. F–9947–C, dated May 25, 1961, gives physical properties of these molecular sieves. The general chemical formula for Type 13X is

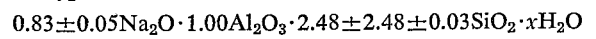

$$0.83 \pm 0.05 Na_2O \cdot 1.00 Al_2O_3 \cdot 2.48 \pm 2.48 \pm 0.03 SiO_2 \cdot xH_2O$$

Type 10X is produced from Type 13X through ion exchange of about 75 percent of the sodium ions by calcium ions. Type 10X will accept molecules smaller than about 10 Angstroms. Type 13X will admit molecules with diameters as large as 13 Angstroms. These molecular sieves, when activated appear to exhibit a selectivity based on the size and shape of the molecules of the material to be adsorbed. It is believed in part that this factor is accountable for the adsorption of carbonyl sulfide and other impurities.

Prior to use in the adsorption of carbonyl sulfide or other materials from a hydrocarbon stream such as natural gas, the molecular sieves are treated by heating to remove the water of hydration, which heating has been previously discussed. Alternatively, the molecular sieve adsorbent materials of the present invention may be rendered capable of adsorbing carbonyl sulfide by purging with an inert gas, for example, or by the use of hydrogen. This latter method is the method used for regeneration of the molecular sieves. It is sometimes preferable to use pressure during the regeneration or preparation of the molecular sieve materials. The regeneration of adsorbent materials can be carried out by using hydrogen from a catalytic reforming operation at any suitable pressure, however, it is generally preferred to carry out the regeneration at approximately system pressure such as used in a catalytic reforming operation.

The catalytic reforming system pressure at which the regeneration of the adsorbent materials can be carried out usually ranges from about 400 to about 1000 p.s.i.g. If hydrogen is employed to regenerate the molecular sieve material, a regeneration temperature ranging from about 300 to about 600° F., preferably 350 to 450° F., can be utilized. Prior to its use in the removal of carbonyl sulfide from the hydrocarbon stream, it can be found useful to heat the molecular sieve material. If this is done, an elevated temperature in the range of 375 to 750° F. can be used for a period of twelve to twenty hours. The preferred range is from 460 to 540° F. for 15 to 17 hours.

The process conditions employed for contacting the sulfur-containing hydrocarbon fluid streams with the molecular sieves of the present invention can vary considerably. A contacting temperature ranging from about 70 to about 200° F., preferably about 100 to 120° F. and a contacting pressure ranging from atmospheric to about 600 p.s.i.g. can be advantageously employed. Volumes of hydrocarbon charge per volume of sieve ranging from about 0.5 to about 5.0 volumes, preferably 0.8 to 1.2 volumes, can also be advantageously used.

When the molecular sieve adsorbent in the adsorption zone has been used to remove sulfur-containing compounds from hydrocarbon stream for a period of time, it may become spent, that is, it will no longer adsorb sulfur-containing compounds. When this occurs, the hydrocarbon stream may be diverted from the molecular sieve and regenerating gas may be cycled through the molecular sieve to desorb or remove the adsorbed sulfur-compounds therefrom. The regenerating gas with the desorbed carbonyl sulfide or other sulfur compound can then be introduced into a suitable conventional sulfur removal zone where the sulfur compound can be removed and the regenerating gas recycled to regenerate another spent molecular sieve. As previously indicated, inert gases or hydrogen can also regenerate the spent molecular sieves, in which case the desorbed sulfur compound will be removed from the inert gases in a manner similar to that for the removal of the sulfur-containing compounds from hydrogen.

Although various impurities can be removed from numerous fluid streams by the method of this invention, the invention has been found particularly useful for the removal of carbon dioxide and carbonyl sulfide from a natural gas stream.

The invention will be more fully explained and understood by referring to the accompanying drawing. It will be understood that the drawing is diagrammatic in feature and is included for illustrative purposes only. Conventional apparatus such as pumps, heat exchangers, control instrument, etc., have, for the most part, been omitted for the sake of simplicity. The use of such equipment, however, is within the scope of the invention. In the interest of simplicity and clarity, the description of the drawing will be made in regard only to the removal of $CO_2$ and carbonyl sulfide from natural gas, however, it is to be understood that the scope of the invention is not limited thereto.

Referring now to the drawing, natural gas is introduced by conduit 1 to absorption and extraction zone 2. The scrubbing solution which in this example is monoethanolamine is introduced to absorption and extraction zone 2 through conduit 3. The absorption and extraction zone 2 can be a packed tower, a bubble plate, a gas washer, or any other suitable form of gas and liquid contact apparatus. In the absorption and extraction zone 2, the monoethanolamine is contacted with the natural gas feed stream and absorbs the carbon dioxide therefrom. The solution from absorption and extraction zone 2 is then passed to regenerating column 5 by conduit 4. The regenerating column 5 can be a fractionating column provided with packing or with bubble plates or other contact means. The column is provided with a reboiler or other heating means 6 which is preferably a tubular heater in which high pressure steam is condensed around the heating tubes. A stream of substantially pure carbon dioxide is drawn off the top of the column through conduit 7.

The regenerated or lean solvent solution is withdrawn from the regenerating column 5 through conduit 8 where it is returned for reuse in absorption and extraction zone 2. If necessary, additional solvent, e.g., monoethanolamine, can be introduced through conduit 9. Natural gas which has had carbon dioxide removed from it passes from the top of absorption and extraction zone 2 through conduit 10 to the molecular sieve adsorption zone 11. In the molecular sieve adsorption zone 11, the natural gas is passed through molecular sieve materials as have been hereinbefore described wherein the carbonyl sulfide is removed from the natural gas. The purified natural gas is then passed from the molecular sieve adsorption zone 11 by conduit 12. Although they have not been shown, various analytical and recycle means to effect complete removal of the carbonyl sulfide from the natural gas stream are contemplated.

SPECIFIC EXAMPLE

TABLE I

| Component | Feed (1) | Lean MEA (3) | MEA Treater Gas Effluent (10) | Mol Sieve Product Gas (12) |
|---|---|---|---|---|
| Natural Gas, s.c.f./d | 1,000,000 | | 1,000,000 | 1,000,000 |
| $CO_2$, vol. percent | 2.0 | | [1] 50 | 0 |
| COS, p.p.m. | 20 | | 5.0 | 0 |
| $H_2S$, p.p.m. | 5.0 | | 0.1 | 0 |
| RSH, p.p.m. | 5.0 | | 5.0 | 0 |
| Monoethanol amine, gal./day (20% MEA) | | 60,000 | | |

[1] Ranges from 25 to 1,000 p.p.m., depending (in part) on $CO_2$ in feed gas.

TABLE II

| Vessel Condition | Zone (2) | Zone (11) |
|---|---|---|
| Temperature, °F | 100 | 100 |
| Pressure, p.s.i.g | 500 | 495 |
| MEA, Gal./m.s.c.f | 60 |  |
| Space Velocity, s.c.f. gas/vol. sieve/hr |  | 20 |
| Ranges: |  |  |
| Temperature, °F | 70–120 | 70–120 |
| Pressure, p.s.i.g | 400–600 | 400–600 |
| MEA, Gal./m.s.c.f | 45–75 |  |
| Space Velocity, v./v./hr |  | 15–25 |

Zone 11 contains Linde Molecular Sieve 13X.

Reasonable variation and modification are possible within the scope of the foregoing disclosure, the drawing and the appended claims to the invention, the essence of which is that there has been provided a method for the removal of carbonyl sulfide or other impurities from a fluid stream which also contains carbon dioxide wherein the carbon dioxide is removed prior to contacting the hydrocarbon stream with a molecular sieve material wherein the carbonyl sulfide or other impurities are removed.

I claim:

1. A method for treating a hydrocarbon stream containing carbon dioxide and carbonyl sulfide comprising contacting the hydrocarbon stream with monoethanolamine whereby carbon dioxide is removed therefrom and contacting the carbon dioxide free hydrocarbon stream with a molecular sieve material having average pore diameters in the range 10–13 Angstrom units whereby sulfur compounds including carbonyl sulfide are removed therefrom by adsorption, said molecular sieve material having been activated prior to said contacting by heating at a temperature and for a time sufficient to remove the water of hydration from the molecular sieve.

2. The method of claim 1 wherein said hydrocarbon stream is natural gas.

3. A method of removing carbon dioxide and carbonyl sulfide from a hydrocarbon gas stream comprising contacting the hydrocarbon gas stream by gas-liquid contact with an absorption contact liquid selected from the groups consisting of caustic, potassium carbonate, sodium carbonate, calcium hydroxide, water soluble alkylolamines including mono-, di- and triethanolamines and propanolamines which contact liquids are selective for carbon dioxide in the presence of carbonyl sulfide whereby carbon dioxide is removed from the gas stream and passing said carbon dioxide free gas through a molecular sieve having average pore diameters in the range 10–13 angstrom units whereby the carbonyl sulfide is adsorbed by the molecular sieve, said molecular sieve material having been activated prior to said contacting by heating at a temperature and for a time sufficient to remove the water of hydration from the molecular sieve.

4. The method of claim 3 wherein said contacting liquid is selected from the group consisting of monoethanolamine, caustic, and potassium carbonate.

5. The method of claim 4 wherein said hydrocarbon gas stream is natural gas.

6. A method for removing carbon dioxide and carbonyl sulfide from natural gas comprising absorbing carbon dioxide from the natural gas stream by contacting said stream with monoethanolamine, regenerating monoethanolamine for reuse in contacting said natural gas, activating a molecular sieve material having average pore diameters in the range 10–13 angstrom units by heating at a temperature and for a time sufficient to remove the water of hydration from said molecular sieve and contacting said carbon dioxide free natural gas with said molecular sieve material whereby the carbonyl sulfide is removed therefrom.

7. A method for removing carbon dioxide and carbonyl sulfide from a hydrocarbon stream comprising contacting said stream with a carbon dioxide absorbent to render said stream substantially free of carbon dioxide and then contacting said stream with a molecular sieve having average pore diameters in the range 10–13 angstrom units to remove said carbonyl sulfide, said molecular sieve having been activated by heating at a temperature and for a time sufficient to remove the water of hydration therefrom.

8. Method of claim 7 wherein said absorbents are selected from the group consisting of caustic, potassium carbonate, sodium carbonate, calcium hydroxide, water soluble alkylolamines including mono-, di- and triethanolamines and propanolamines which contact liquids are selective for carbon dioxide in the presence of carbonyl sulfide.

9. Method of claim 7 wherein said hydrocarbon stream is natural gas.

References Cited

UNITED STATES PATENTS

| | | | |
|---|---|---|---|
| 3,051,646 | 8/1962 | Brooke | 208—245 X |
| 3,211,644 | 10/1965 | Clark | 208—245 |
| 3,358,421 | 12/1967 | Huxley et al. | 55—73 X |

OSCAR R. VERTIZ, Primary Examiner

E. C. THOMAS, Assistant Examiner

U.S. Cl. X.R.

23—2; 55—73; 208—245; 260—676